United States Patent [19]

Munakata

[11] Patent Number: 5,800,744
[45] Date of Patent: Sep. 1, 1998

[54] METHOD FOR PRODUCING A DIOPTRIC PHOTOCROMIC SEMI-FINISHED LENS

[76] Inventor: Yoshikazu Munakata, 2-3-35-606 Nishimiyahara Yodogawa-ku, Osaka 532, Japan

[21] Appl. No.: 699,776

[22] Filed: Aug. 13, 1996

[51] Int. Cl.[6] .................................................. B29D 11/00
[52] U.S. Cl. .................................. 264/1.7; 264/2.7; 156/99
[58] Field of Search ........................... 264/1.1, 1.7, 2.2, 264/2.7; 156/99

[56] References Cited

U.S. PATENT DOCUMENTS

| | | | |
|---|---|---|---|
| 4,139,586 | 2/1979 | Gasson | 264/2.7 |
| 5,084,226 | 1/1992 | Tarhon et al. | 264/2.7 |
| 5,286,419 | 2/1994 | Van Ligten et al. | 264/2.7 |
| 5,405,557 | 4/1995 | Kingsbury | 264/1.8 |
| 5,523,030 | 6/1996 | Kingsbury | 264/2.2 |

FOREIGN PATENT DOCUMENTS 60-50501  3/1985  Japan .......................... 264/1.7

*Primary Examiner*—Mathieu D. Vargot
*Attorney, Agent, or Firm*—Jordan and Hamburg

[57] ABSTRACT

A method of producing a dioptric photochromic semi-finished lens, a diopter of which is to be imparted by grinding a concave surface of the semi-finished lens. Color concentration between a center portion and a peripheral portion is maintained at a fixed color concentration independent of the diopter of the lens and the lens is shockproof. In the method, after mixing a photochromic material with a thermoplastic polycarbonate resin to make a sheet, the sheet is processed to have a spherical surface sheet, set in a mold and thermoplastic polycarbonate resin is injected in the mold to be bonded with the sheet.

14 Claims, 2 Drawing Sheets

METHOD FOR PRODUCING A DIOPTRIC PHOTOCROMIC SEMI-FINISHED LENS

BACKGROUND OF THE INVENTION

The present invention relates to a method for producing a photochromic semi-finished lens to correct eyesight.

Conventionally, photochromic semi-finished lenses for correcting eyesight are manufactured using an organic liquid raw material of allyl-diglycol-carbonate(=CR39). In this method, photochromic material is mixed in the above mentioned organic liquid raw material.

When manufacturing a given lens diopter, the thickness of the lens is different between its central and peripheral portions. Therefore, when the lens is manufactured by the above mentioned conventional method, colors react to ultraviolet resulting in the thick part being dark and the thin part being light. Thus, there is both light and dark areas in the lens.

Even if the quantity of photochromic material mixed in is the same, the color concentration is different, since the thickness of the lens differs according to the diopter.

Furthermore, a CR39 lens, a leading model lens for glasses, is not shockproof and not suitably safe.

SUMMARY OF THE INVENTION

It is an object of the present invention to produce a dioptric photochromic semi-finished lens without any tinting differences between the center portion and the peripheral portion, even if colors are produced in reaction to ultraviolet rays.

It is another object of the present invention to produce a photochromic semi-finished lens which maintains its color concentration whatever the diopter of the lens is.

It is another object of the present invention to produce a photochromic semi-finished lens which is shockproof and safe.

The above objects are realized by mixing a photochromic material in a thermoplastic polycarbonate resin to make a sheet of a predetermined thickness. The sheet is processed to have a spherical surface. Then, a thermoplastic polycarbonate resin is injected in the mold, in which the above mentioned processed spherical surface sheet is set, to unite the sheet and the resin.

DETAILED DESCRIPTION OF THE PREFERRED EMBODIMENTS

The preferred embodiments of the present invention will be described with reference to the drawings.

Figure 1:
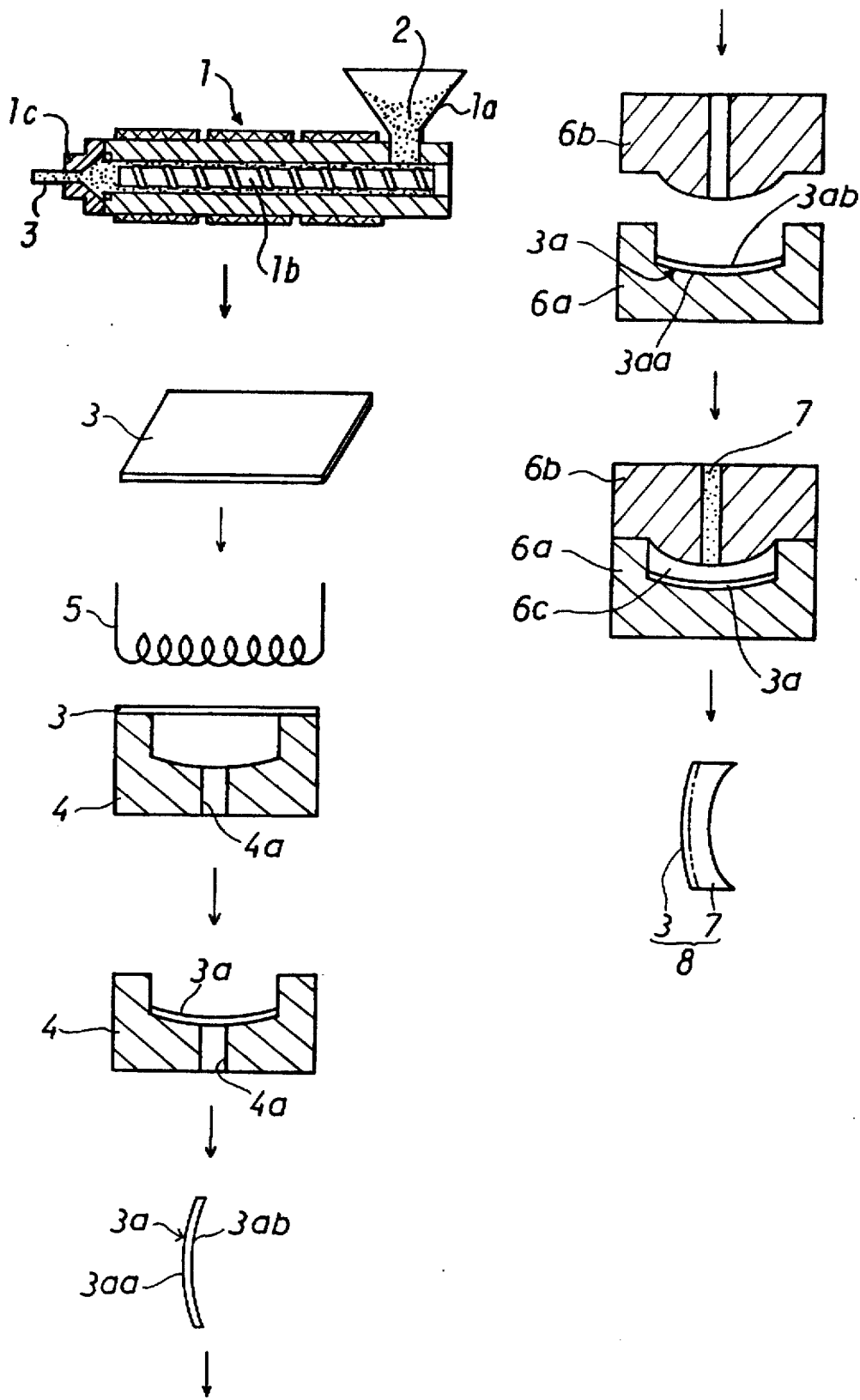
FIG. 1 is a flow diagram of a first embodiment of a method of manufacturing a photochromic semi-finished lens.

Referring to FIG. 1, in the first embodiment, a material 2 is supplied to a hopper 1a in an extruder. Supplied material 2 is pressed out by an extrusion die 1c at the end of the screw 1b to obtain a sheet 3 having a thickness from 0.3 to 1.8 millimeters. The thickness of this sheet 3 is determined according to the color of the shade resulting from the reaction of sheet 3 to ultraviolet rays.

Supplied material 2 is made by mixing photochromic material in a thermoplastic polycarbonate resin. The photochromic material is made by mixing a polycarbonate type resin containing copolyester carbonate, organic photochromic compound and hindered amine type compound at the weight ratio of 100, 0.001 to 2.0, and 0.1 to 5.0.

There is no limitation to the kinds of organic photochromic compound used in the claimed method. It is possible to add one or more compounds of an azobenzene type compound, thioindigo type compound, dithizone metal complex, spiropyrene type compound, spirooxazine type compound, fulgide type compound, dihydropyrene compound, spirothiopyrene type compound, 1,4-2H-oxazine-triphenylmethane type compound, chromene/chloramine type compound and fulgimide type compound and the like according to the desired color and color concentration.

The manufactured sheet 3 is cut into the required length and shape to make a photochromic semi-finished lens and then it is fixed in a mold 4. After it is softened with the heat of heater 5, the air inside the mold 4 is drawn out through an exhaust hole 4a of the mold 4. By using vacuum forming, the sheet 3 is processed to have a fixed spherical surface having a curving shape. The radius of curvature is determined by the diopter of the manufactured semi-finished lens.

This curved sheet 3 is hereinafter referred to as curve shape sheet 3a.

Curve shape sheet 3a has a convex surface 3aa which is placed in contact with a lower mold 6a.

Then, an upper mold 6b is inserted into lower mold 6a. A thermoplastic polycarbonate resin 7 is injected in a space 6c between the lower mold 6a and the upper mold 6b.

In this way, curve shape sheet 3a and polycarbonate resin 7 are united into one to produce the photochromic semi-finished lens 8.

The photochromic semi-finished lens 8 produced by the above method has the photochromic function only in the curve shape sheet 3a, not the whole lens. So, if an ultraviolet ray absorbent is mixed in the polycarbonate resin 7 injected in the concave surface 3ab of the curve shape sheet 3a, it is possible to perfectly absorb ultraviolet rays which are harmful to the eyes without impeding the photochromic function.

In contrast, the photochromic semi-finished lens made by a conventional method is entirely photochromic. If it absorbs ultraviolet rays perfectly, the photochromic function does not work. So, the conventional photochromic semi-finished lens cannot absorb ultraviolet rays perfectly.

The curve shape sheet 3a of the photochromic semi-finished lens 8 made by the above method has a fixed thickness so that every part of the lens has the same color concentration.

The diopter of the photochromic semi-finished lens 8 made by the above method is determined by the polycarbonate resin 7 injected onto the concave surface 3ab side of the curve shape sheet 3 so as to maintain a fixed color concentration following a change in the diopter.

The photochromic semi-finished lens 8 made by the above method is made of polycarbonate resin so that it is shockproof and difficult to break even if it is manufactured as a thin lens.

Figure 2:
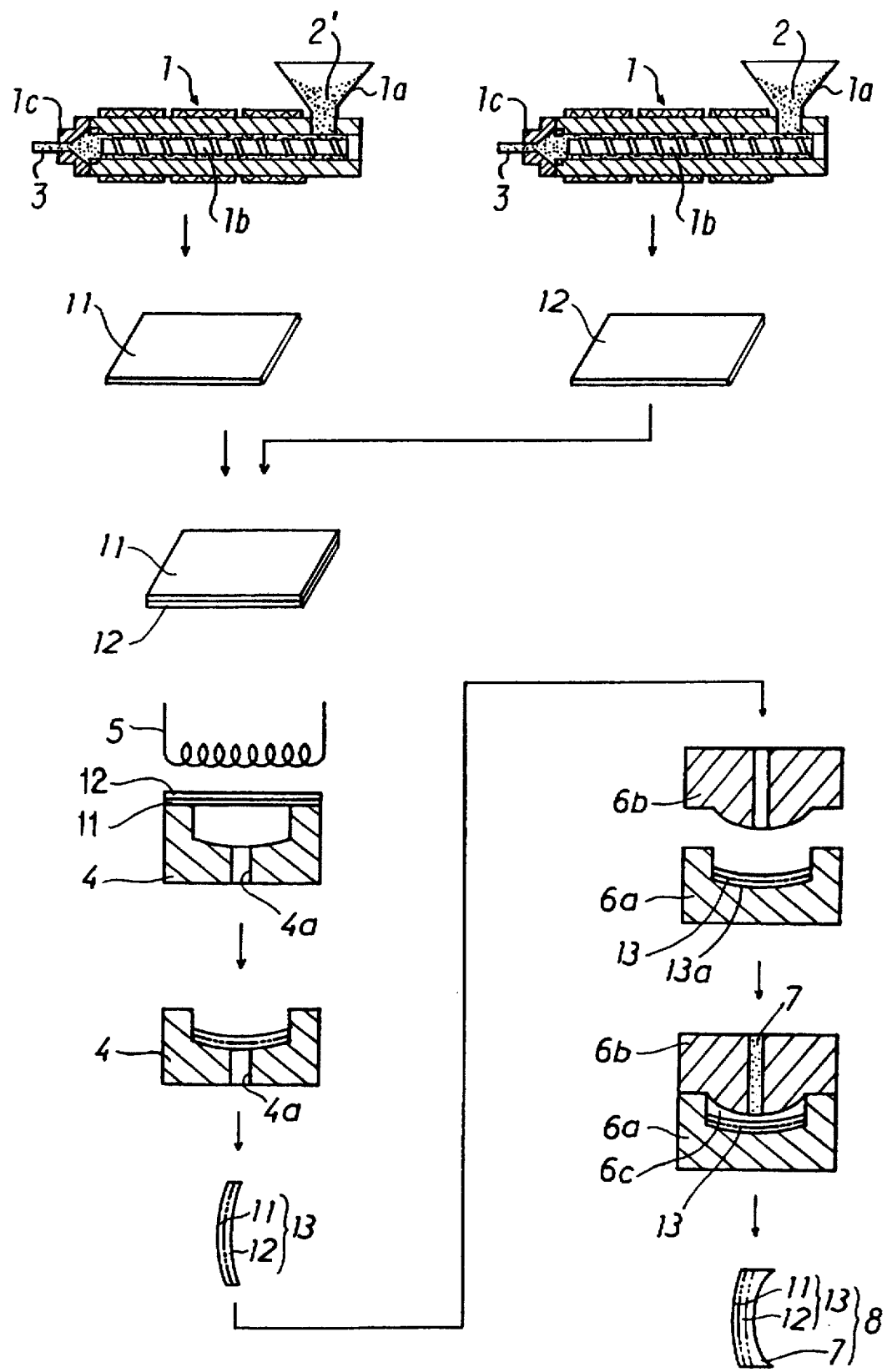
FIG. 2 is a flow diagram of a second embodiment of a method of manufacturing a photochromic semi-finished lens.

Referring to FIG. 2, in the second embodiment, a sheet 11 is extruded by the extruder 1 which is the same as in the first embodiment shown in FIG. 1, and has a thickness from 0.5 to 1.0 millimeter. The thickness of the sheet 11 is determined according to the color of the shade resulting from the reaction of the sheet 11 to ultraviolet rays. However, in the second embodiment a material 2' supplied to the extruder 1 is made by mixing the photochromic material, which is the same as in the first embodiment, with a thermoplastic triacetate resin.

A reinforcement sheet 12 is extruded by the extruder 1 from the thermoplastic polycarbonate and has a thickness from 0.3 to 1.0 millimeter.

In this embodiment, the sheet 11 and the sheet 12 are united into one by an adhesive. This adhesive is prepared, for example, by first preparing a cross linking agent by pouring 36.8 grams of ethyl acetate or toluene into 1 gram of isophoronediisocyanate. An acrylic two liquid type pressure sensitive adhesive is prepared by mixing 100 parts by weight of the main agent (ethylene-acrylate-copolymer) with 5 parts by weight of the above cross linking agent.

It is possible for sheet 11 and sheet 12 to be united into one by applying between the sheets this acrylic two liquid type pressure sensitive adhesive in a thickness of 25 to 30 microns, and then heating the assembly to 100 degrees centigrade under pressure, drying for two minutes at a temperature of 100 degrees centigrade and holding the assembly for three to five days at a temperature of 40 degrees centigrade.

The united sheet 11 and 12 is cut to the required length and shape to make a photochromic semi-finished lens and is fixed in the mold 4. By the vacuum forming process, which is the same as in the first embodiment, the united sheet 11 and 12 is processed to have a fixed spherical surface so that it is curved. The radius of curvature is determined by the diopter of the manufactured semi-finished lens. This combined curving shape sheet 11 and 12 is hereinafter referred to as the curve-shaped sheet 13.

The curve shape sheet 13 has a curving surface 13a which is put in contact with a lower mold 6a. The thermoplastic polycarbonate resin 7 is injected in a space 6c between the lower mold 6a and the upper mold 6b, as in the first embodiment.

Then the curve shape sheet 13 and the polycarbonate resin 7 are united into one to obtain the photochromic semi-finished lens 8.

Incidentally, it would be impossible to adhere a curved sheet of polycarbonate resin 7 to sheet 13 by vacuum forming in the second embodiment.

As for the photochromic semi-finished lens 8 made by the inventive method of the second embodiment, the triacetate resin has the photochromic function instead of the polycarbonate resin shown in the first embodiment so that it is possible to improve the photochromic function, i.e., coloring or fading, in the photochromic semi-finished lens made by the inventive method of the second embodiment. However, the strength of the lens of the second embodiment would be less than that of the first if sheet 12, made of the polycarbonate resin, was not used to reinforce it in the second embodiment.

What is claimed is:

1. A method for producing a dioptric photochromic semi-finished lens comprising the steps of:
   mixing a photochromic material into a thermoplastic polycarbonate resin to make a photochromic resin
   forming a sheet of the photochromic resin having a predetermined thickness;
   curving the sheet to have a spherical surface to form a spherically curved sheet with a convex surface and a concave surface;
   placing the spherically curved sheet in a mold; and
   injecting a thermoplastic polycarbonate resin into the mold to form the dioptric photochromic semi-finished lens with the convex surface of the spherically curved sheet forming a front convex surface of the dioptric photochromic semi-finished lens and the concave surface bonding with the thermoplastic polycarbonate resin injected into the mold.

2. The method of claim 1, wherein the sheet is 0.3 to 1.8 mm thick.

3. The method of claim 1, wherein the photochromic resin is made by mixing a polycarbonate resin containing copolyester carbonate, an organic photochromic compound and a hindered amine in a weight ratio of 100, 0.001 to 2.0 and 0.1 to 5.0.

4. A method for producing a dioptric photochromic semi-finished lens comprising the steps of:
   mixing a photochromic material into a triacetate resin to make a photochromic resin:
   forming a first sheet, having a predetermined thickness, of the photochromic resin;
   forming a second sheet of a thermoplastic polycarbonate resin having a predetermined thickness;
   applying an adhesive layer to one of the first and second sheets;
   adhering the first sheet to the second sheet via said adhesive layer to form a compound sheet;
   curving the compound sheet to form a spherically curved compound sheet such that the first sheet forms a convex surface and said second sheet forms a concave surface;
   placing the spherically curved compound sheet in a mold; and
   and injecting a thermoplastic polycarbonate resin into the mold to form the dioptric photochromic semi-finished lens with the convex surface of the spherically curved compound sheet forming a front convex surface of the dioptric photochromic semi-finished lens and the concave surface bonding with the thermoplastic polycarbonate resin injected into the mold.

5. The method of claim 4, wherein the first sheet is 0.5 to 1.0 mm thick and the second sheet is 0.3 to 1.0 mm thick.

6. The method of claim 4, wherein the adhesive layer has a thickness in the range of 25 to 30 microns.

7. The method of claim 4, wherein the adhesive layer is formed of an acrylic pressure sensitive adhesive including a cross linking agent.

8. The method of claim 4, wherein the adhesive layer is formed of 100 parts ethylene-acrylate-copolymer and 5 parts of a cross linking agent by weight, the cross linking agent including ethyl acetate and isophoronediisocyanate at a weight ratio of about 36.8:1.

9. The method of claim 4, wherein the thermoplastic polycarbonate resin injected into the mold includes an ultraviolet ray absorber for absorbing ultraviolet rays passing through the spherically curved compound sheet.

10. The method of claim 1, wherein the thermoplastic polycarbonate resin injected into the mold includes an ultraviolet ray absorber for absorbing ultraviolet rays passing through the spherically curved compound sheet.

11. A method for producing a dioptric photochromic semi-finished lens comprising the steps of:
   mixing a photochromic material into a triacetate resin to make a photochromic resin;
   forming a first sheet, having a predetermined thickness, of the photochromic resin;
   forming a second sheet of a thermoplastic polycarbonate resin having a predetermined thickness;
   preparing a cross linking agent including ethyl acetate and isophoronediisocyanate at a weight ratio of about 36.8:1 preparing an adhesive including ethylene-acrylate-copolymer and the cross linking agent at weight ratio of about 100:5;

applying the adhesive to at least one of the first and second sheets to form an adhesive layer;

applying the first sheet to the second sheet with said adhesive layer therebetween to form a sheet assembly;

applying pressure to and heating the sheet assembly to about 100° C. to dry;

maintaining the assembly under pressure for three to five days at a temperature of about 40° C. to form a compound sheet of the first and second sheets;

curving the compound sheet to form a spherically curved compound sheet such that the first sheet forms a convex surface and said second sheet forms a concave surface;

placing the spherically curved compound sheet in a mold; and injecting a thermoplastic polycarbonate resin into the mold to form the dioptric photochromic semi-finished lens with the convex surface of the spherically curved compound sheet forming a front convex surface of the dioptric photochromic semi-finished lens and the concave surface bonding with the thermoplastic polycarbonate resin injected into the mold.

12. The method of claim 10, wherein the adhesive layer has a thickness in the range of 25 to 30 microns.

13. The method of claim 10, wherein the thermoplastic polycarbonate resin injected into the mold includes an ultraviolet ray absorber for absorbing ultraviolet rays passing through the spherically curved compound sheet.

14. The method of claim 10, wherein the first sheet is 0.5 to 1.0 mm thick and the second sheet is 0.3 to 1.0 mm thick.

* * * * *